United States Patent [19]
O'Brien et al.

[11] Patent Number: 5,923,913
[45] Date of Patent: Jul. 13, 1999

[54] IRIS DIAPHRAGM

[75] Inventors: Michael J. O'Brien, Rochester; Robert C. Bryant, Honeoye Falls; Richard A. Colleluori, Rochester, all of N.Y.

[73] Assignee: Eastman Kodak Company, Rochester, N.Y.

[21] Appl. No.: 09/018,370

[22] Filed: Feb. 4, 1998

[51] Int. Cl.⁶ .................................................. G03B 9/02
[52] U.S. Cl. ............................................................ 396/510
[58] Field of Search ................................... 396/505, 510

[56] References Cited

U.S. PATENT DOCUMENTS

| | | |
|---|---|---|
| 3,348,463 | 10/1967 | Nerwin . |
| 3,349,682 | 10/1967 | Nerwin . |
| 3,487,762 | 1/1970 | Peterson et al. . |
| 3,526,176 | 9/1970 | Hackenberg et al. . |
| 3,836,234 | 9/1974 | Farnsworth ........................... 396/510 |
| 4,009,946 | 3/1977 | Geyer et al. . |
| 5,589,906 | 12/1996 | Shimizu . |
| 5,635,999 | 6/1997 | O'Brien et al. . |

Primary Examiner—Russell Adams
Attorney, Agent, or Firm—Roger Fields

[57] ABSTRACT

An iris diaphragm comprises a stationary circular base having a pair of opposite sides and pivot pins at only one of the sides, a plurality of opaque blades positioned adjacent the side of the circular base that has the pivot pins to define an aperture between the blades, and having pivot holes that contain the pivot pins to permit the aperture to be changed in size by pivoting the blades about the pivot pins, a rotatable ring positioned adjacent the side of the circular base without the pivot pins, and a plurality of interconnections between the ring and respective ones of the blades to make rotation of the ring relative to the circular base pivot the blades about the pivot pins.

17 Claims, 7 Drawing Sheets

IRIS DIAPHRAGM

FIELD OF THE INVENTION

The invention relates generally to the field of diaphragms, and in particular to an iris diaphragm.

BACKGROUND OF THE INVENTION

The diameter of a given bundle of light rays passing through a lens determines the brightness of the image formed. The maximum diameter of this bundle depends on the optical diameter of the lens. By placing plates with holes of various sizes, or a set of metal leaves to form an adjustable hole, in the light path of a lens it is possible to adjust the diameter of this bundle of rays, and hence the intensity of illumination of the image. The device with such a hole is known generally as a diaphragm.

An iris diaphragm is usually formed by a set of thin metal blades mounted on a ring around the lens. Closing the blades inwards makes the hole smaller. Opening the blades makes the hole larger. The greater the number of blades in an iris diaphragm, the more nearly the hole approaches a perfectly circular shape similar to the lens. In a camera or a photographic printer, the iris diaphragm is generally an integral part of the lens/shutter assembly. Iris diaphragms are also used in other optical systems—e.g., on the substage condenser of a microscope.

When cost is a significant factor in the manufacture of an iris diaphragm, such as in an inexpensive camera, it has been suggested that the iris diaphragm be a simple one-piece structure. By way of example, commonly assigned prior art U.S. Pat. No. 3,348,463 issued Oct. 24, 1967 discloses a one-piece iris diaphragm comprising several blades, a drive lever integrally formed with one of the blades, and flexible interconnections between the blades.

SUMMARY OF THE INVENTION

According to one aspect of the invention, a one-piece part for an iris diaphragm comprises:
  a plurality of opaque blades;
  a ring; and
  a plurality of interconnections integrally formed with the ring and with respective ones of the blades to make the ring and the blades one piece, and being constructed to allow the interconnections to be individually bent in order to fold the blades over the ring to define an aperture.

According to another aspect of the invention, an iris diaphragm comprises:
  a stationary circular base having a pair of opposite sides and pivot pins at only one of the sides;
  a plurality of opaque blades positioned adjacent the side of the circular base that has the pivot pins to define an aperture between the blades, and having pivot holes that contain the pivot pins to permit the aperture to be changed in size by pivoting the blades about the pivot pins;
  a rotatable ring positioned adjacent the side of the circular base without the pivot pins; and
  a plurality of interconnections between the ring and respective ones of the blades to make rotation of the ring relative to the circular base pivot the blades about the pivot pins.

According to another aspect of the invention, a method of assembling an iris diaphragm that has a plurality of opaque blades, a ring, and a plurality of interconnections between the ring and respective ones of the blades which can be individually bent in order to fold the blades over the ring to define an aperture, comprises the steps of:
  bending the interconnections, and folding the blades over the ring to define the aperture.

DETAILED DESCRIPTION OF THE INVENTION

The invention is disclosed as being embodied preferably in an iris diaphragm/lens barrel assembly. Because the features of an iris diaphragm/lens barrel assembly are generally known, the description which follows is directed in particular only to those elements forming part of or cooperating directly with the disclosed embodiment. It is to be understood, however, that other elements may take various forms known to a person of ordinary skill in the art.

Figure 1:
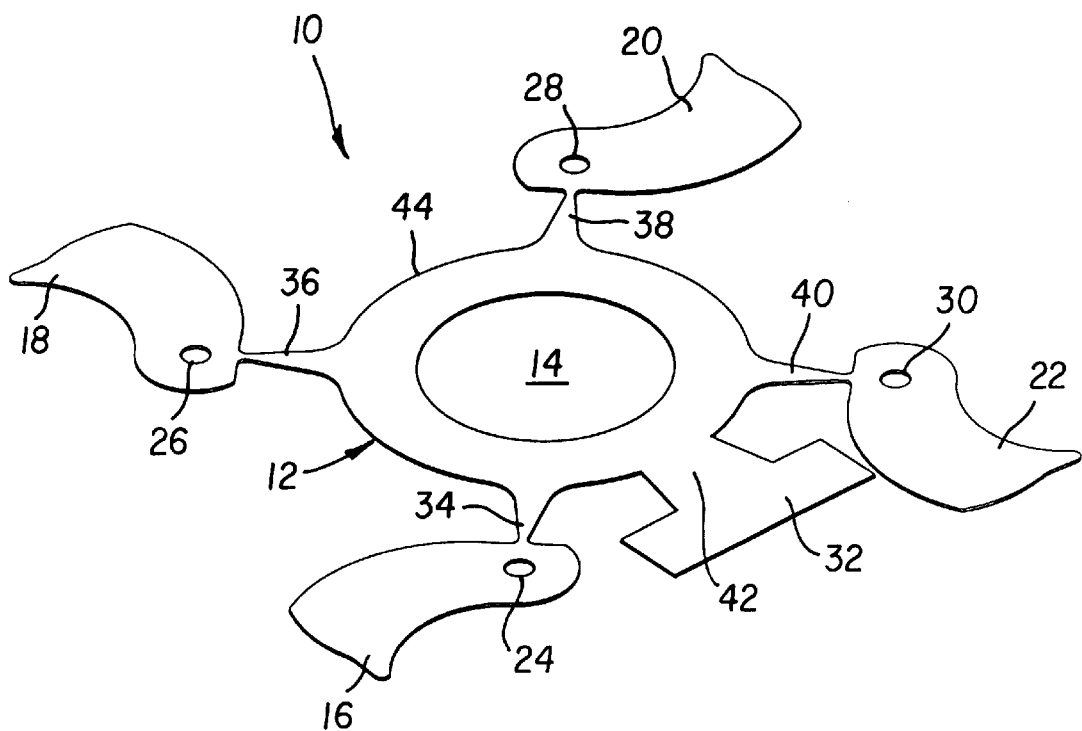
FIG. 1 is a top perspective view of a one-piece part for an iris diaphragm.
Figure 2:
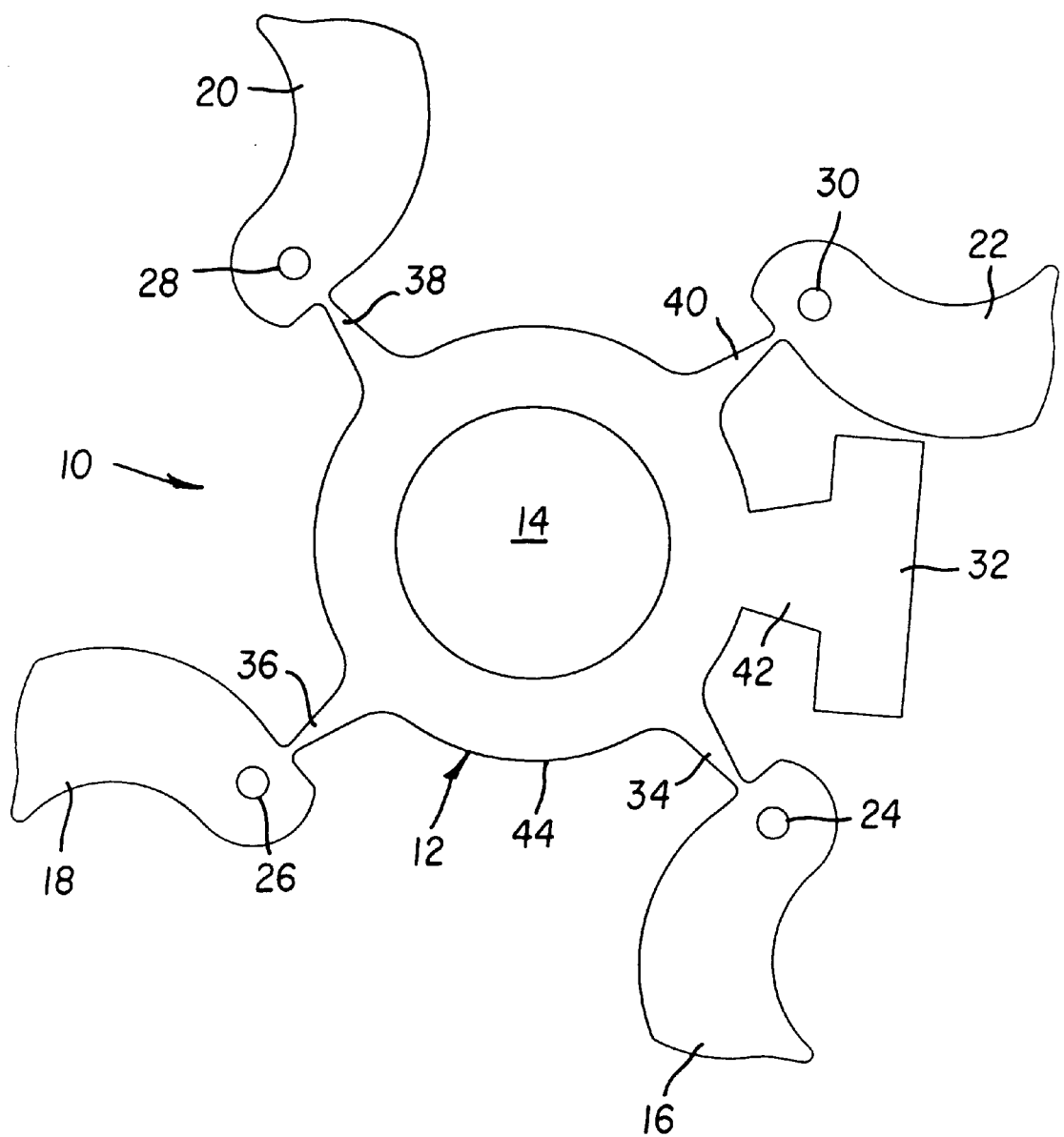
FIG. 2 is a top plan view of the one-piece part as shown in FIG. 1.

Referring now to the drawings, FIGS. 1 and 2 show a one-piece part 10 for an iris diaphragm comprising a control ring 12 having a center hole 14, four blades 16, 18, 20 and 22 having individual pivot holes 24, 26, 28 and 30, a driven tab-like member 32, four flexible interconnections 34, 36, 38 and 40 integrally formed with the ring and with respective ones of the blades, and a single flexible interconnection 42 integrally formed with the ring and the driven member. The ring 12, the four blades 16, 18, 20 and 22, the driven tab-like member 32, and the five interconnections 34, 36, 38, 40 and 42 are substantially flat, are coplanar in FIGS. 1 and 2, and are made from a known opaque "Mylar" material. The four interconnections 34, 36, 38 and 40 are evenly spaced from one another at the outer periphery 44 of the ring 12, and project radially and are tapered from the outer periphery of the ring to respective ones of the blades 16, 18, 20 and 22. The four pivot holes 24, 26, 28 and 30 are aligned radially with respective ones of the interconnections 34, 36, 38 and 40.

Figure 3:
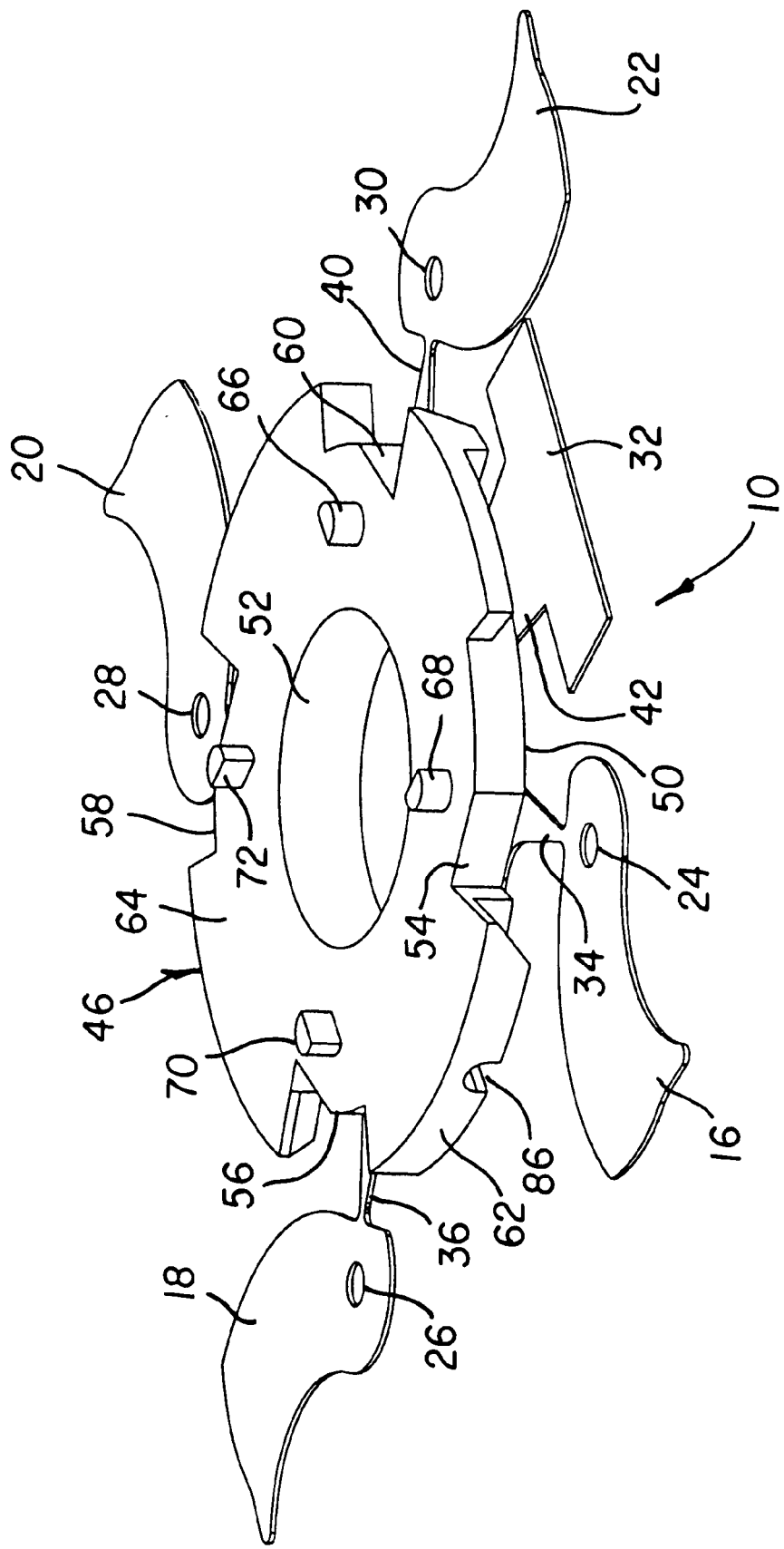
FIGS. 3, 4 and 5 are perspective views of the one-piece part and a circular base; showing the sequential steps for connecting the one-piece part to the circular base to form an iris diaphragm.
Figure 4:
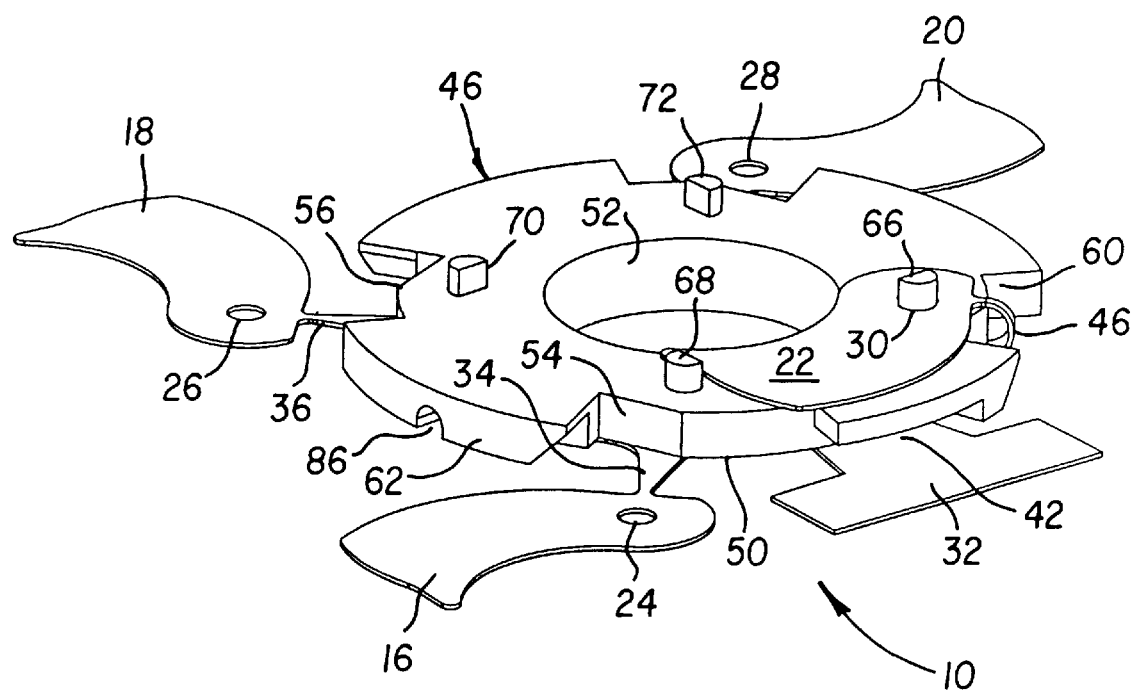
Figure 5:
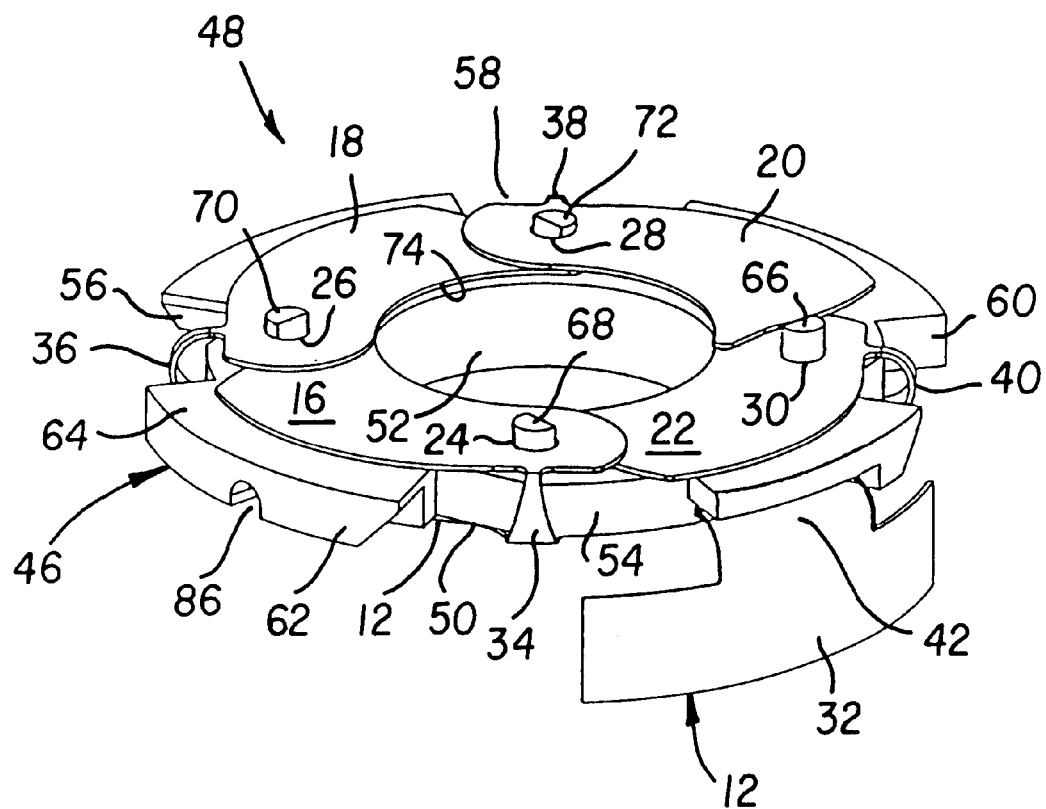

FIGS. 3–5 show how the one-piece part 10 is connected to a circular support base 46 to form an iris diaphragm 48. The circular support base 46 is made from a known opaque rigid plastic material. First, as shown in FIG. 3, the ring 12 is positioned against an underside 50 of the circular base 46, with the center hole 14 in the ring aligned with a similar-diameter center hole 52 in the circular base, and with the four interconnections 34, 36, 38 and 40 aligned with individual notches 54, 56, 58 and 60 in the outer perimeter 62 of the circular base. Then, as shown in FIG. 4, the interconnection 40 is bent upward into the notch 60 and the blade 22 is folded over a top side 64 of the circular base 46 to locate a pivot pin 66 on the top side in the pivot hole 30 in the blade. Next, as shown in FIG. 5, the interconnection 34 is bent upward into the notch 54 and the blade 16 is folded over the top side 64 of the circular base 46 to locate a pivot pin 68 on the top side in the pivot hole 24 in the blade and to position the blade slightly overlapping the blade 22. Next, as shown in FIG. 5, the interconnection 36 is bent upward into the notch 50 and the blade 18 is folded over the top side 64 of the circular base 46 to locate a pivot pin 70 on the top side in the pivot hole 26 in the blade and to position the blade slightly overlapping the blade 16. Next, as shown in FIG. 5, the interconnection 38 is bent upward into the notch 58 and the blade 20 is folded over the top side 64 of the circular base 46 to locate a pivot pin 72 on the top side in the pivot hole 28 in the blade and to position the blade slightly overlapping the blade 18. And finally, as shown in FIG. 5, the interconnection 42 is bent downward adjacent the outer perimeter 62 of the circular base 46 to position the driven member 32 parallel to and offset from the outer perimeter.

As shown in FIG. 5, the four blades 16, 18, 20 and 22 define an aperture 74 between them which is aligned with the center hole 52 in the circular base 46. If the ring 12 is rotated relative to the circular base 46, clockwise in FIG. 5, the blades 16, 18, 20 and 22 will be pivoted clockwise about the pivot pins 68, 70, 72 and 66, i.e. in a closing direction, to make the aperture 74 smaller. If the ring 12 is rotated relative to the circular base 46, counter-clockwise in FIG. 5, the blades 16, 18, 20 and 22 will be pivoted counter-clockwise about the pivot pins 68, 70, 72 and 66, i.e. in an opening direction, to make the aperture 74 larger.

Figure 6:
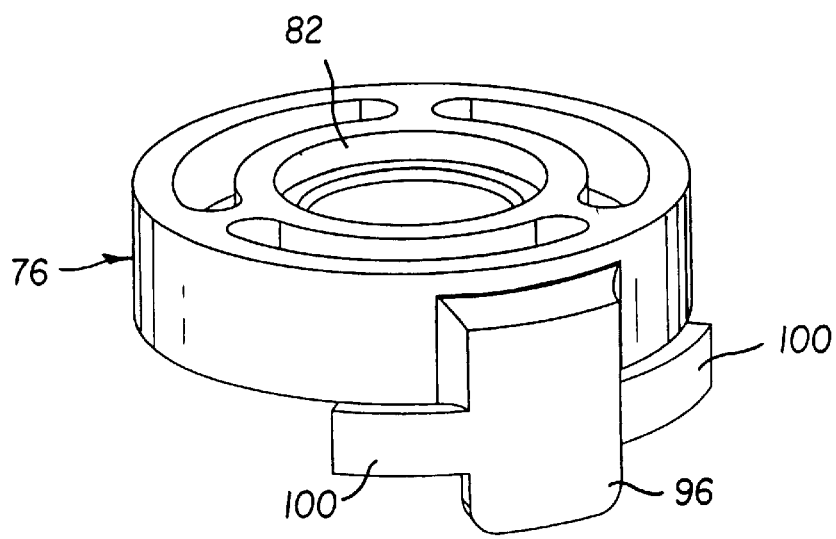
FIG. 6 is an exploded top perspective view of an iris diaphragm/lens barrel assembly.
Figure 6:
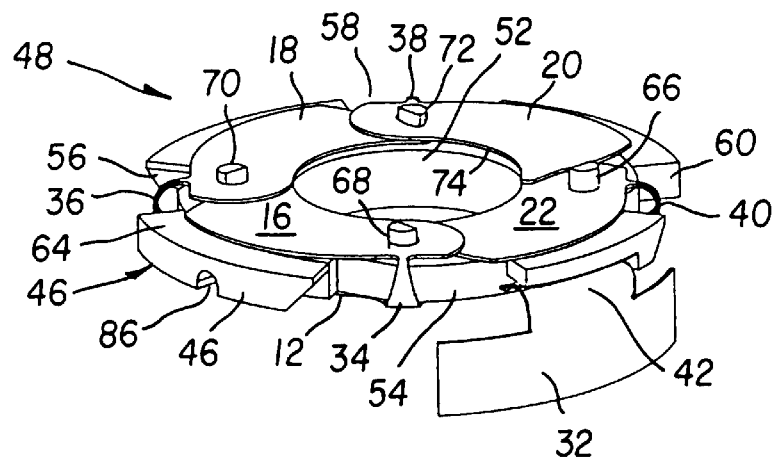
Figure 6:
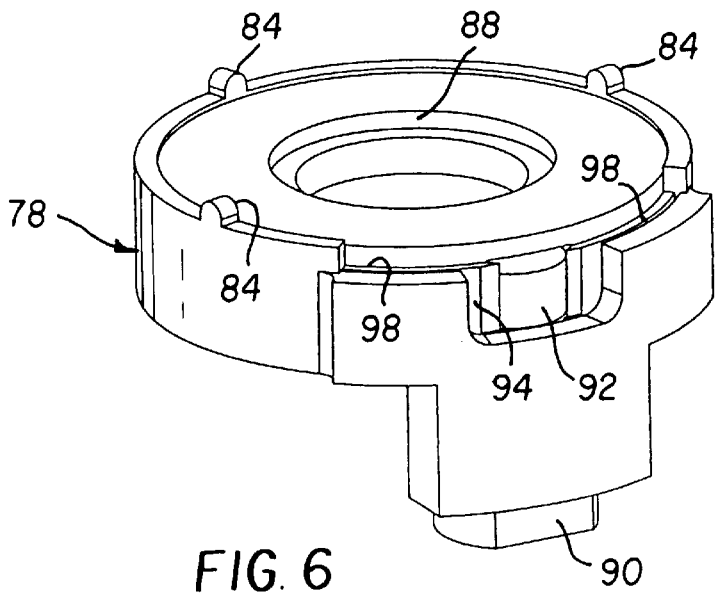
Figure 7:
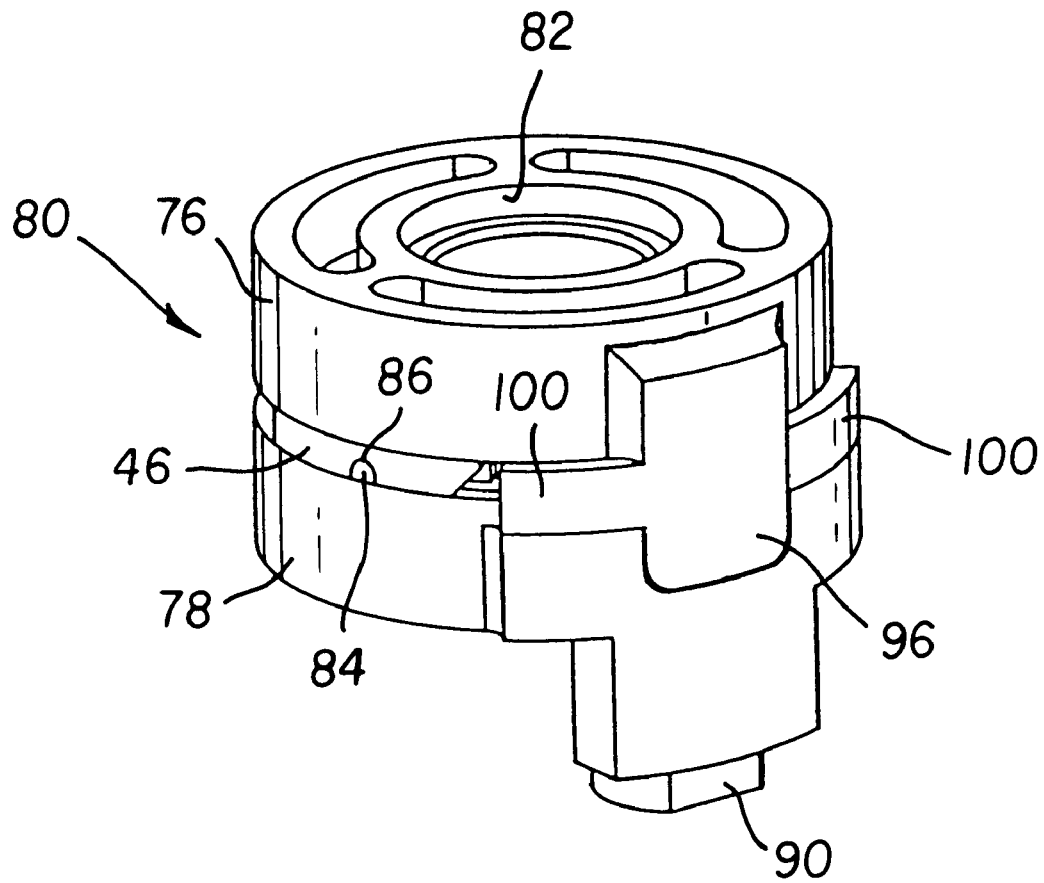
FIG. 7 is a top perspective view of the iris diaphragm/lens barrel assembly shown in FIG. 6.

FIGS. 6 and 7 show how the iris diaphragm 48 is located between a pair of front and rear portions 76 and 78 of a lens barrel to form an iris diaphragm/lens barrel 80. The front portion 76 of the lens barrel rests securely on the four pivot pins 66, 68, 70 and 72 to fix the front portion to the circular base 46. A center hole 82 in the front portion 76 of the lens barrel is aligned with the center hole 52 in the circular base 46. The rear portion 78 of the lens barrel has several protuberances 84 that are secured in mating concavities 86 in the outer perimeter 62 of the circular base 46 to fix the rear portion to the circular base. A center hole 88 in the rear portion 78 of the lens barrel is aligned with the center hole 52 in the circular base 46. A bi-directional motor 90 supported on the rear portion 78 of the lens barrel is rotationally coupled with a rubber roller 92 rotatable within a pocket 94 in the rear portion. The driven tab-like member 32 of the ring 12 is positioned in the pocket 94, against the roller 92, to be driven by the roller. A pressure pad 96 that depends from the front portion 76 of the lens barrel covers the pocket 94 and holds the driven tab-like member 32 against the roller 92. When the motor 90 is "on", the roller 92 is rotated in contact with the driven tab-like member 32 to rotate the ring 12 relative to the circular base 46, to pivot the blades 16, 18, 20 and 22 about the pivot pins 68, 70, 72 and 66, i.e. in the opening or closing direction, to make the aperture 74 larger or smaller. The pocket 94 has a pair of opposite slot-like extensions 98 into which the driven tab-like member 32 can be moved. The pressure pad 96 has a pair of arm-like extensions 100 that cover the respective slot-like extensions 98.

The invention has been described with reference to a preferred embodiment. However, it will be appreciated that variations and modifications can be effected by a person of ordinary skill in the art without departing from the scope of the invention. For example, the ring 12 can include a magnetic encodement to be sensed to determine the rotational position of the ring.

PARTS LIST 10. one-piece part
12. control ring
14. center hole
16. blade
18. blade
20. blade
22. blade
24. pivot hole
26. pivot hole
28. pivot hole
30. pivot hole
32. driven tab-like member
34. interconnection
36. interconnection
38. interconnection
40. interconnection
42. interconnection
44. outer periphery of ring 12
46. circular base
48. iris diaphragm
50. underside of base 46
52. center hole
54. notch
56. notch
58. notch
60. notch
62. outer perimeter of base 46
64. top side of base
66. pivot pin
68. pivot pin
70. pivot pin
72. pivot pin
74. aperture
76. front portion of lens barrel
78. rear portion of lens barrel
80. iris diaphragm/lens barrel
82. center hole
84. protuberances
86. concavities
88. center hole
90. motor
92. roller
94. pocket
96. pressure pad
98. slot-like extensions
100. arm-like extensions

What is claimed is:

1. A one-piece part for an iris diaphragm comprising:
   a plurality of opaque blades;
   a ring; and
   a plurality of interconnections integrally formed with said ring and with respective ones of said blades to make the ring and the blades one piece, and being constructed to allow said interconnections to be individually bent in order to fold said blades over said ring to define an aperture.

2. A one-piece part for an iris diaphragm as recited in claim 1, wherein said blades, said ring and said interconnections are substantially flat and coplanar.

3. A one-piece part for an iris diaphragm as recited in claim 1, wherein said interconnections are evenly spaced from one another about said ring.

4. A one-piece part for an iris diaphragm as recited in claim 3, wherein said interconnections project radially from said ring to respective ones of said blades.

5. A one-piece part for an iris diaphragm as recited in claim 1, wherein said interconnections project radially from said ring to respective ones of said blades, and said blades have pivot holes aligned radially with said interconnections.

6. A one-piece part for an iris diaphragm as recited in claim 1, wherein said interconnections are tapered from said ring to respective ones of said blades.

7. An iris diaphragm comprising:
    a stationary circular base having a pair of opposite sides and pivot pins at only one of said sides;
    a plurality of opaque blades positioned adjacent said side of the circular base that has said pivot pins to define an aperture between the blades, and having pivot holes that contain said pivot pins to permit said aperture to be changed in size by pivoting the blades about the pivot pins;
    a rotatable ring positioned adjacent said side of the circular base without said pivot pins; and
    a plurality of interconnections between said ring and respective ones of said blades to make rotation of the ring relative to said circular base pivot said blades about said pivot pins.

8. An iris diaphragm as recited in claim 7, wherein said interconnections are integrally formed with said ring and with respective ones of said blades to make the ring and the blades one piece.

9. An iris diaphragm as recited in claim 7, wherein said circular base has an annular perimeter between said opposite sides of the circular base, and said interconnections are bent around said annular perimeter of the circular base.

10. An iris diaphragm as recited in claim 9, wherein said annular perimeter of the circular base has respective notches which contain said interconnections.

11. An iris diaphragm/lens barrel assembly comprising:
    a stationary circular base having a pair of opposite sides and pivot pins at only one of said sides;
    a plurality of opaque blades positioned adjacent said side of the circular base that has said pivot pins to define an aperture between said blades, and having pivot holes that contain said pivot pins to permit said aperture to be changed in size by pivoting the blades about the pivot pins;
    a rotatable ring positioned adjacent said side of the circular base without said pivot pins;
    a plurality of interconnections between said ring and respective ones of said blades to make rotation of the ring relative to said circular base pivot the blades about said pivot pins;
    a front portion of a lens barrel positioned over said blades; and
    a rear portion of said lens barrel positioned over said ring.

12. An iris diaphragm/lens barrel assembly as recited in claim 11, wherein said rear portion of the lens barrel supports a motor for rotating said ring relative to said circular base to pivot said blades about said pivot pins.

13. An iris diaphragm/lens barrel assembly as recited in claim 11, wherein said rear portion of the lens barrel has a pocket containing a rotatable driving member, and said ring has a driven member that projects into said pocket to be driven by said driving member to rotate the ring relative to said circular base.

14. An iris diaphragm/lens barrel assembly as recited in claim 13, wherein said front portion of the lens barrel has a pressure member that projects into said pocket to hold said driven member against said driving member.

15. A method of assembling an iris diaphragm that has a plurality of opaque blades, a ring, and a plurality of interconnections between the ring and respective ones of the blades which can be individually bent in order to fold the blades over the ring to define an aperture, said method comprising the steps of:
    bending the interconnections, and folding the blades over the ring to define the aperture.

16. A method of assembling an iris diaphragm that has a circular base with a pair of opposite sides and pivot pins at only one of the sides, a plurality of opaque blades with pivot holes for the pivot pins, a ring, and a plurality of interconnections between the ring and respective ones of the blades which can be individually bent in order to fold the blades over the circular base to define an aperture, comprises the steps of:
    positioning the ring adjacent the side of the circular base without the pivot pins; and
    bending the interconnections and folding the blades over the circular base to locate the pivot pins in the pivot holes, whereby the aperture can be changed in size by rotating the ring relative to the base to pivot the blades about the pivot pins.

17. A method of assembling an iris diaphragm as recited in claim 16, wherein respective ones of the interconnections are bent and corresponding ones of the blades are folded over the circular base in successive pairs to locate the pivot pins in the pivot holes sequentially in order to partially overlap the blades.

* * * * *